United States Patent

Bhatia et al.

[11] Patent Number: 6,112,101
[45] Date of Patent: Aug. 29, 2000

[54] LOAD BASED PRIORITY FOR THE MOBILE SUBSCRIBER

[75] Inventors: Ranjit Bhatia; Gunnar Borg, both of Dallas, Tex.

[73] Assignee: Ericsson Inc., Research Triangle Park, N.C.

[21] Appl. No.: 08/947,643

[22] Filed: Oct. 9, 1997

[51] Int. Cl.[7] .................... H04B 7/00; H04Q 7/20
[52] U.S. Cl. .................... 455/512; 455/450; 455/453
[58] Field of Search .................. 455/453, 9, 452, 455/512, 527, 450, 432, 434, 437; 370/348, 331, 332, 459, 437

[56] References Cited

U.S. PATENT DOCUMENTS

| | | | |
|---|---|---|---|
| 4,788,543 | 11/1988 | Rubin | 340/825.44 |
| 5,371,780 | 12/1994 | Amitay | 455/437 |
| 5,454,026 | 9/1995 | Tanaka | 455/437 |
| 5,570,411 | 10/1996 | Sicher | 455/450 |
| 5,574,977 | 11/1996 | Joseph et al. | 455/450 |
| 5,615,249 | 3/1997 | Solondz | 455/450 |
| 5,729,542 | 3/1998 | Dupont | 370/346 |
| 5,740,533 | 4/1998 | Lin | 455/432 |
| 5,752,193 | 5/1998 | Scholefield et al. | 455/452 |
| 5,896,376 | 4/1999 | Alperovich et al. | 370/348 |

FOREIGN PATENT DOCUMENTS

WO 95/35637 12/1995 WIPO .
WO 97/09836 3/1997 WIPO .
WO 97/19525 5/1997 WIPO .

OTHER PUBLICATIONS

Michel Mouly et al.; *RR Procedures*; 1993, GSM System for Mobile Communications, pp. 366–373 and 424–429.

EPO Search Report dated Feb. 8, 1999.

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A "load based priority" telecommunications system and method which provides efficient use of Traffic Channels (TCHs), while both meeting the subscriber's needs and producing revenue for the cellular operator. "Load based priority" for the mobile subscribers consists of assigning a priority to the subscriber at the time of service activation. The subscriber can pay a low rate for lower priority subscriptions and a higher rate for higher priority subscriptions. The system continuously checks the traffic load on the TCH and broadcasts the current priority in the system information message to the mobile stations in the cell. For example, if the system broadcast message reads low priority, then all mobile subscribers will be able to make calls. However, if the system broadcast message reads high priority, then mobile subscribers who have purchased a lower priority subscription will not be able to make calls.

12 Claims, 4 Drawing Sheets

| Cell | Load | Priority 1 | Priority 2 | Universal |
|------|------|------------|------------|-----------|
| xyz  | 20%  | Yes        | Yes        | Yes       |
| ABC  | 80%  | Yes        | No         | No        |

LOAD BASED PRIORITY FOR THE MOBILE SUBSCRIBER

BACKGROUND OF THE PRESENT INVENTION

1. Field of the Invention

The present invention relates generally to telecommunications systems and methods for managing traffic channels in a wireless network, and specifically to prioritizing subscribers' use of the traffic channels.

2. Background and Objects of the Present Invention

Cellular telecommunications is one of the fastest growing and most demanding telecommunications applications ever. Today it represents a large and continuously increasing percentage of all new telephone subscriptions around the world. A standardization group, Global System for Mobile Communication (GSM), was established in 1982 to formulate the specifications for mobile cellular radio systems.

With reference now to FIG. 1 of the drawings, there is illustrated a Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MS may also include a Subscriber Identity Module (SIM) 13, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The digital GSM system uses Time Division Multiple Access (TDMA) to handle radio traffic in each cell 22. Each TDMA communication frame is divided into eight separate time slots, forming eight physical channels for communications. Logical channels are then mapped onto these physical channels. Examples of logical channels include Traffic Channels (TCH) and Control Channels (CCH).

A great deal of information must be transmitted between the BTS 24 and the MS 20, e.g., user data and control signaling. Different types of information are transmitted on the physical channels in a certain order. For example, speech is sent on a Traffic Channel (TCH), which during the transmission is allocated a certain physical channel. Traffic channels can be either full rate or half rate. One full rate TCH occupies one physical channel, while two half rate TCHs can share one physical channel.

In the GSM system, TCHs are generally considered the most precious of resources. In congested areas and during peak times of use, there may be no available TCHs, thereby preventing subscribers from placing potentially important calls. An operator can increase the number of TCHs by either introducing more hardware or using more frequency channels in a cell. However, both of these techniques are expensive for the operator.

It is therefore an object of the invention to allow for efficient use of the TCHs which both meets the subscriber's expectations and immediate needs, and produces revenue for the cellular operator.

SUMMARY OF THE INVENTION

The present invention is directed to telecommunications systems and methods for providing efficient use of the TCHs, while both meeting the subscriber's needs and producing revenue for the cellular operator. "Load based priority" for the mobile subscriber consists of assigning a priority to the subscriber at the time of service activation. The subscriber can pay a low rate for lower priority subscriptions and a higher rate for higher priority subscriptions. The system continuously checks the traffic load on the TCH and broadcasts the current priority in the system information message to the mobile stations in the cell. For example, if the system broadcast message reads low priority, then all mobile subscribers will be able to make calls. However, if the system broadcast message reads high priority, then mobile subscribers who have purchased a lower priority subscription will not be able to make calls.

In order to insure that important phone calls can be placed, the MS will have the capability to change the priority dynamically, for an extra fee. Load based priority advantageously provides the cellular service provider with an efficient means of differentiating the service. The cellular service provider can sell low cost subscriptions for the low priority subscribers, thereby increasing the customer base without increasing the need for more TCHs. Therefore, the TCH resources will be used more efficiently at a reduced cost to the mobile subscribers.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In preferred embodiments of the load based priority system of the present invention, the BSC 23 keeps track of the resource usage for each cell. When the utilization of the TCHs reaches a certain predefined threshold, the BSC 23 can initiate the load based priority for the call setup.

Figure 1:
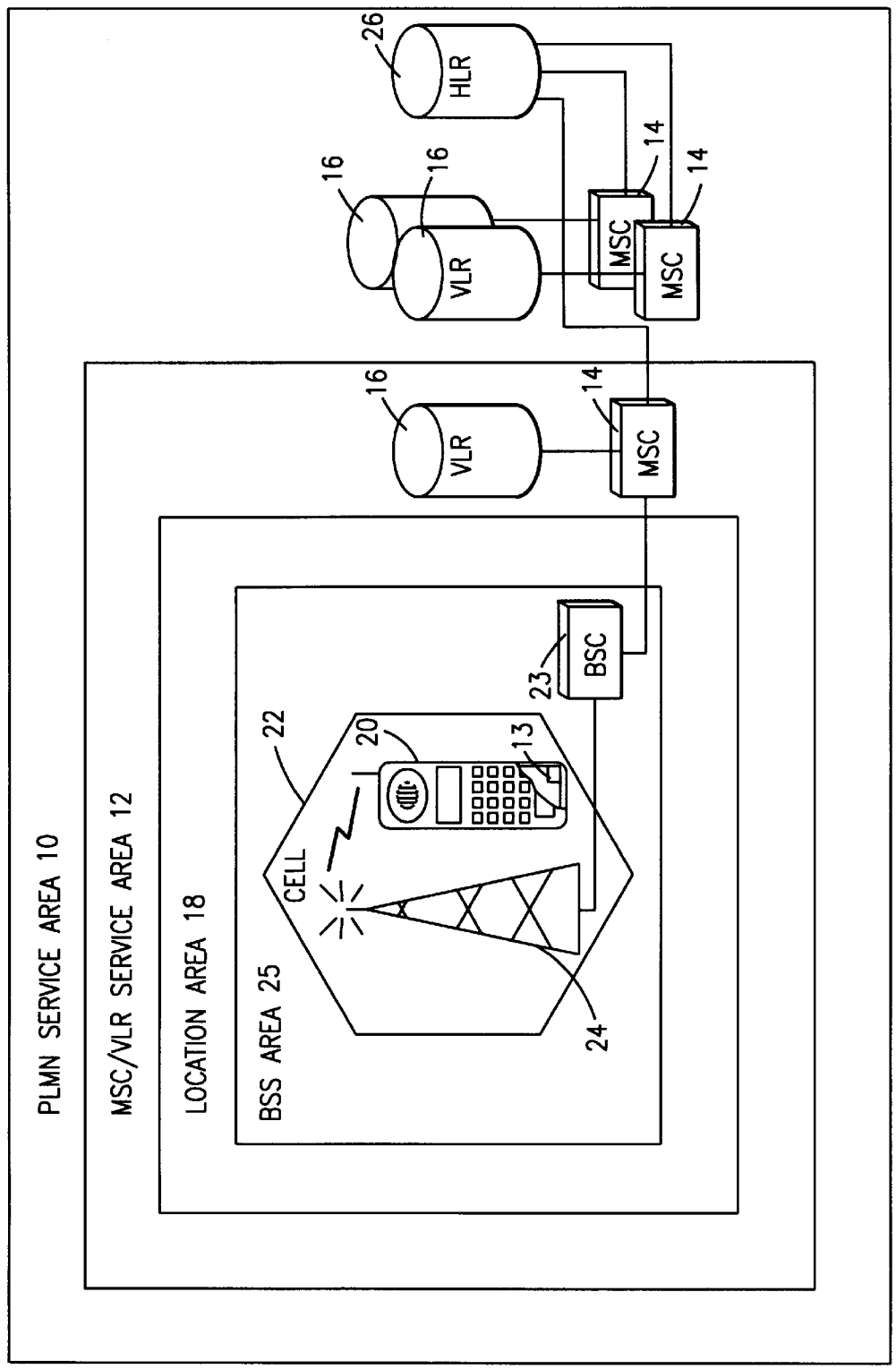
FIG. 1 is a block diagram of a conventional terrestrially-based wireless telecommunications system.
Figure 2A:
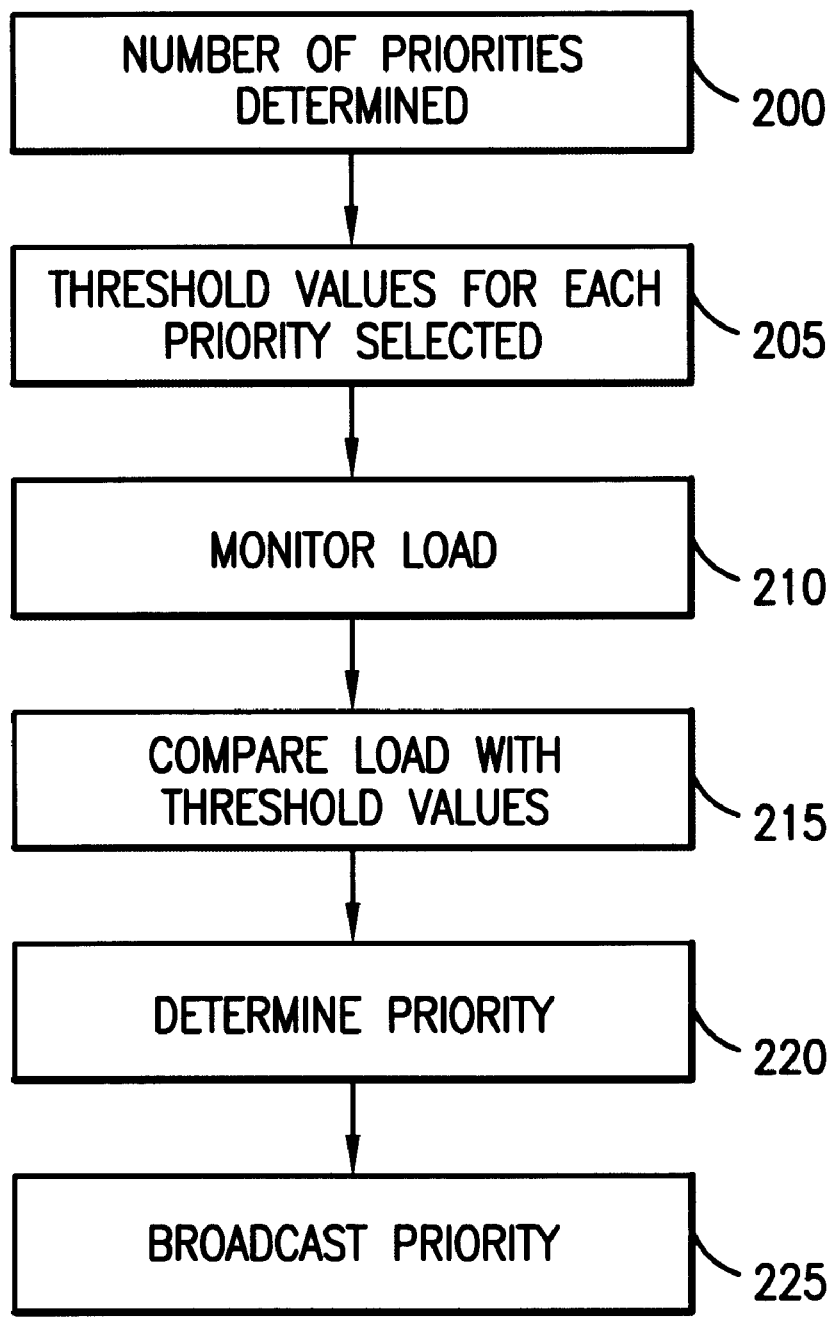
FIGS. 2A and 2B are flow charts illustrating embodiments of the load based priority system of the present invention.

For example, in one embodiment, the BSC 23 monitors the load in each cell 22 and updates the load and priority data per cell 22, as shown in the flow chart of FIG. 2A. First, the operator determines the number of priorities that will be available for subscribers to purchase (step 200). The priorities can be allocated per cell 22 or in general at the network level 10. Thereafter, the operator selects the threshold values for the load associated with each of the priorities (step 205). The load monitoring application (LMA) 420 of the BSC 23, shown in FIG. 4, then monitors the load (step 210) by calculating the percentage of TCHs in use for each cell 22. The load values are continuously compared with the threshold values (step 215) to determine the current priority (step 220). The current priority will be the priority for which the threshold value is immediately below the load.

The BTS 24 then broadcasts the current priority in the cell 22 (step 225), allowing only mobile subscribers with the current priority or higher priorities to access the cellular network 10. Once the load reaches a different threshold value (by either going above or below the previous threshold value), a different priority will be broadcast (either a higher or lower priority respectfully).

Figure 2B:
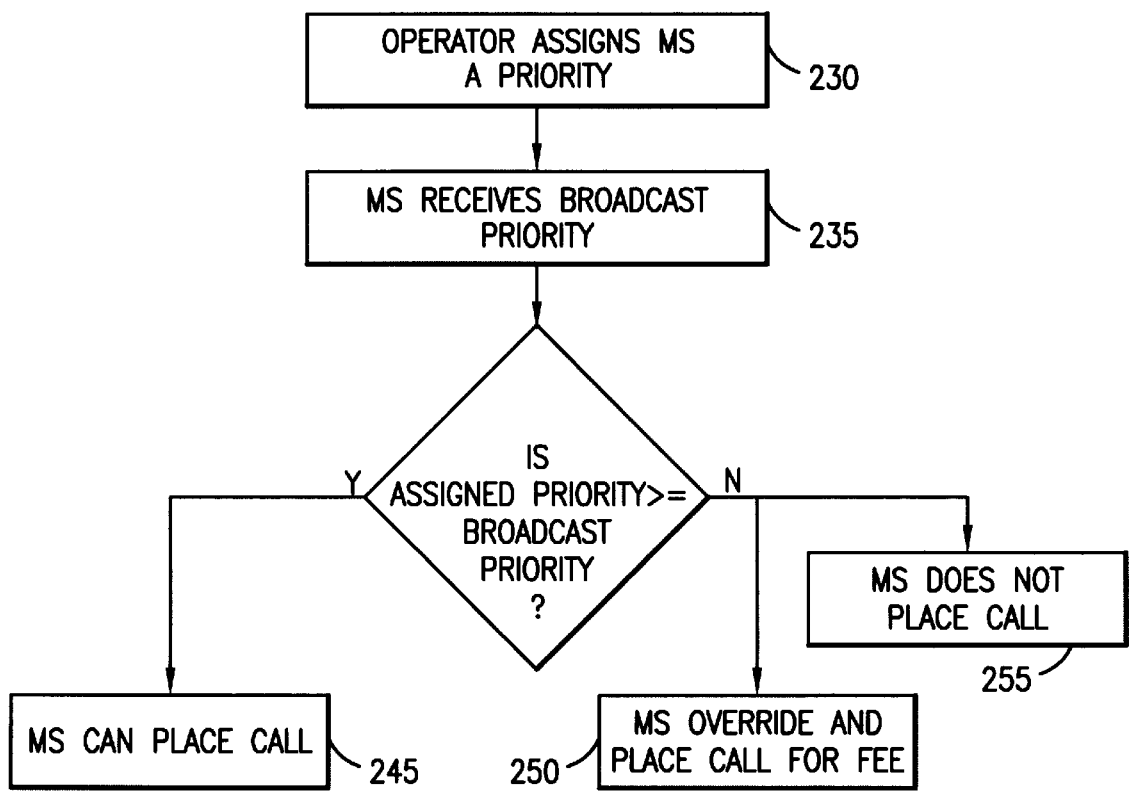

The relationship between the MS 20 and the broadcast message is described in FIG. 2B. As shown in FIG. 2B, after the operator has assigned the MS 20 a priority (step 230), the MS 20 receives the current broadcast priority (step 235) and compares it to the assigned priority (step 240) stored within, for example, the SIM 13. If the assigned priority is equivalent to or higher than the current broadcast priority, the MS 20 can place the call (step 245). However, if the assigned priority is less than the current broadcast priority, the MS 20 can either override the priority and place the call for a fee (step 250), or will not be allowed to place the call (step 255).

Figures 3, 4:
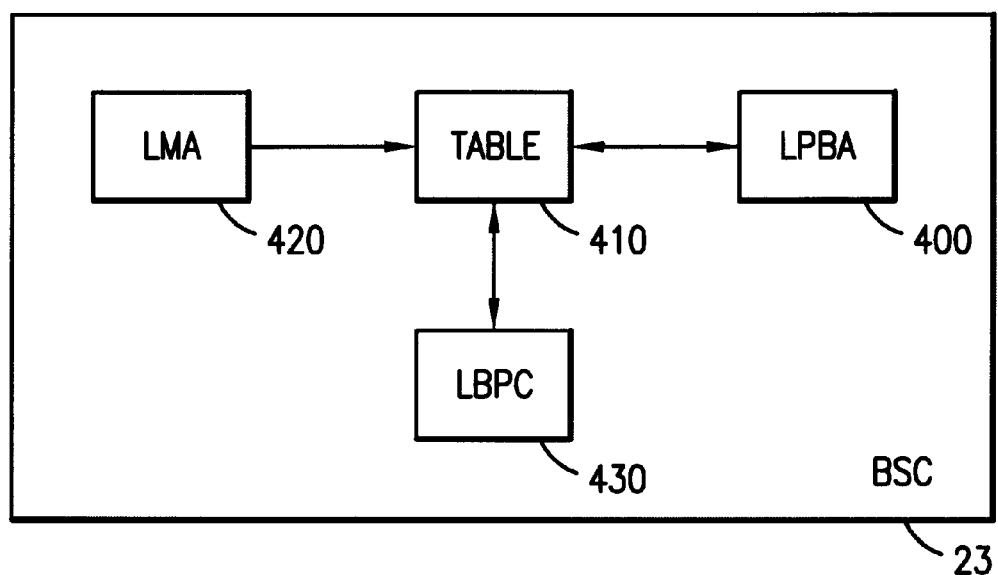
FIG. 3 is a table depicting a sample load based priority situation.
FIG. 4 shows the interrelationship between various elements of the load based priority system.

As an example, FIG. 3 depicts a sample load based priority situation. In FIG. 3, only two priorities are shown for simplicity, Priority 1 and Priority 2, with Priority 1 being the higher priority. However, the actual number of priorities can be more or less as determined by the operator. The load based priority calculations (LBPC) 430, shown in FIG. 4, have already been performed for both the xyz and ABC cells. This includes the comparison (step 215) and determination of priority (step 220) steps in FIG. 2. The amount of load and whether each priority has access to the cellular network 10 is listed.

As shown in FIG. 3, the load for the xyz cell is only at 20%, which is less than the predefined threshold value for Priority 1. Therefore, all priorities are valid (e.g. all mobiles can make a call in the cellular network). Thus, Priority 2 will be broadcast in the cell 22.

However, for the ABC cell, the load is at 80%. Therefore, the predefined Priority 1 threshold has been met, and only mobile subscribers with Priority 1 are allowed to make calls. The BTS broadcast message will read Priority 1 only. However, as mentioned above, the mobile subscriber will be able to change the MS 20 priority to Priority 1 in order to place urgent calls, with the understanding that an extra fee will be billed for the call.

Depending upon operator defined data, the priority will be updated. FIG. 4 shows the relationship between some of the elements involved in the load based priority system, which, for example, can be located within the BSC 23. The Load Based Priority Application (LBPA) 400 will read a table 410, such as the one shown in FIG. 3, and if the priority is "YES" for a certain load in cell, the lower priority will be broadcasted in the cell 22. In addition, the Load Based Priority Calculations (LBPC) 430 will continuously be performed, using the information about the load from the LMA 420, and updating the table 410 as necessary.

When a mobile subscriber originates a call, the MS 20 will read the priority broadcasted for the cell 22 the MS 20 is in, and compare the broadcasted priority with the priority stored in the mobile subscriber's SIM card 13 at the time of subscription. If the mobile subscriber has a higher or equal priority as compared with the priority broadcasted, the call will go through. Otherwise, the call will be rejected with the appropriate message.

As will be recognized by those skilled in the art, the innovative concepts described in the present application can be modified and varied over a wide range of applications, and accordingly the scope of patented subject matter is not limited by any of the specific exemplary teachings given.

For example, it should be noted that the load based priority system described herein can be implemented in the MSC 14. The table, similar to the one shown in FIG. 3, can be stored in the MSC 14, and the MSC 14 can have an application to request the load information on each cell 22 from the BSCs 23. The MSC 14 can then inform the BSCs 23 of the priority in each cell 22. Specifically, in the AMPS system of Japanese systems, the MSC 14 contains all of the information about the cells 22.

It should also be noted that when the subscriber is in a different location area, the priority originally assigned to the subscriber may or may not be recognized in this area, depending on whether an agreement has been formed between the location areas.

What is claimed is:

1. A telecommunications system for prioritizing usage of traffic channels within said system, comprising:
   a base station system having
   traffic load threshold values and associated priority codes for a cell served by said base station system stored therein, said base station system being configured to monitor the load on said traffic channels, determine a current traffic load value, compare said current traffic load value to said traffic threshold values to determine a current one of said priority codes associated with a select one of said traffic load threshold values having a value immediately above said current traffic load value and broadcast said current Priority code in said cell; and a mobile station in wireless communication with said base station system within said cell, said mobile station having a mobile priority code stored therein, said mobile priority code being subscribed to and chosen by a user of said mobile station, said mobile station being configured to receive said broadcasted current priority code, compare said current priority code to said stored mobile priority code and selectively restrict access by said mobile station to said system in response to a determination that said mobile priority code is lower than said current Priority code.

2. The telecommunications system of claim 1, wherein said mobile station has a Subscriber Identity Module therein, said mobile priority code for said mobile station being stored in said Subscriber Identity Module.

3. The telecommunications system of claim 1, wherein said current priority code is updated when said current traffic load value changes with respect to at least one of said traffic load threshold values.

4. The telecommunications system of claim 1, wherein said base station system comprises a base transceiver station for broadcasting said current priority code.

5. The telecommunications system of claim 1, wherein said mobile priority code is selected from the group consisting of: low priority, medium priority, and high priority.

6. The telecommunications system of claim 1, wherein said mobile station allows itself access to said system in response to a user input changing said mobile priority code to at least equal said broadcasted current priority code.

7. A method for prioritizing usage of traffic channels within a wireless telecommunications system, comprising the steps of:

storing traffic load threshold values and associated priority codes for a cell within a base station system serving said cell;

monitoring the load on said traffic channels to determine a current traffic load value;

comparing said current traffic load value to said traffic load threshold values to determine a current one of said priority codes associated with a select one of said traffic load threshold values having a value immediately above said current traffic load value;

broadcasting said current priority code in said cell to a mobile station in wireless communication with said base station system;

comparing said broadcasted current priority code with a mobile priority code stored within said mobile station, said mobile priority code being subscribed to and chosen by a user of said mobile station; and selectively restricting access by said mobile station to said system in response to a determination that said mobile priority code is lower than said current priority code.

8. The method of claim 7, wherein said mobile station has a Subscriber Identity module therein, said mobile priority code for said mobile station being stored in said Subscriber Identity Module.

9. The method of claim 7, wherein said current priority code is updated when said current traffic load value changes with respect to at least one of said traffic load threshold values.

10. The method of claim 7, wherein said base station system comprises a base transceiver station, said step of broadcasting being performed by said base transceiver station.

11. The method of claim 7, wherein said mobile priority code is selected from the group consisting of: low priority, medium priority, and high priority.

12. The method of claim 7, further comprising the steps of:

after said step of selectively restricting access, changing said mobile priority code associated with said mobile station to at least equal said broadcasted current priority code, using said mobile station; and accessing said system by said mobile station.

* * * * *